(12) United States Patent
Park et al.

(10) Patent No.: US 9,442,590 B2
(45) Date of Patent: Sep. 13, 2016

(54) DISPLAY DEVICE AND METHOD FOR CONTROLLING THE SAME

(71) Applicant: LG ELECTRONICS INC., Seoul (KR)

(72) Inventors: Sihwa Park, Seoul (KR); Yongsin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 13 days.

(21) Appl. No.: 14/322,579

(22) Filed: Jul. 2, 2014

(65) Prior Publication Data

US 2015/0324565 A1 Nov. 12, 2015

(30) Foreign Application Priority Data

May 9, 2014 (KR) .................. 10-2014-0055613

(51) Int. Cl.
*H04L 29/00* (2006.01)
*G06F 3/041* (2006.01)
*G06F 21/31* (2013.01)

(52) U.S. Cl.
CPC ............. *G06F 3/041* (2013.01); *G06F 3/0412* (2013.01); *G06F 21/31* (2013.01)

(58) Field of Classification Search
CPC ......... H04W 12/06; G06F 3/003; G06F 9/44
USPC .......................................... 345/161; 455/411
See application file for complete search history.

(56) References Cited

U.S. PATENT DOCUMENTS 6,100,811 A 8/2000 Hsu et al.
6,633,090 B2 10/2003 Harter et al.
2009/0091544 A1 4/2009 Lindroos
2012/0306748 A1* 12/2012 Fleizach ................. G06F 3/033
 345/161
2013/0122866 A1* 5/2013 Huang .................... G06F 21/31
 455/411
2013/0145438 A1 6/2013 Choi et al.

FOREIGN PATENT DOCUMENTS

| CA | EP 2778908 A1 * | 9/2014 | ........... G06F 9/4443 |
| CN | 101150794 A * | 3/2008 | |
| WO | WO 2009/085338 A2 | 7/2009 | |
| WO | WO 2010/126190 A1 | 11/2010 | |
| WO | WO 2012/023642 A1 | 2/2012 | |

* cited by examiner

*Primary Examiner* — Brandon Hoffman
*Assistant Examiner* — Michael D Anderson
(74) *Attorney, Agent, or Firm* — Birch, Stewart, Kolasch & Birch, LLP

(57) ABSTRACT

A display device and a method for controlling the same are disclosed. The display device comprises an input unit configured to receive a command for generating an event and a fingerprint; a control unit configured to generate the event in accordance with the command and process the generated event; and a display unit configured to display a user menu, wherein the input unit includes a touch recognition layer for recognizing a touch input and a fingerprint recognition layer for recognizing a fingerprint, the touch recognition layer and the fingerprint recognition layer being formed in a single body with the display unit and receiving a command for generating an event of a temporary unlock fingerprint setting mode and a first fingerprint different from a registered fingerprint, the control unit implements the temporary unlock fingerprint setting mode in accordance with the command for generating the input event, sets the input first fingerprint to a temporary unlock fingerprint, and unlocks the display device if the temporary unlock fingerprint is input thereto, and the temporary unlock fingerprint is released in accordance with a predetermined condition.

19 Claims, 11 Drawing Sheets

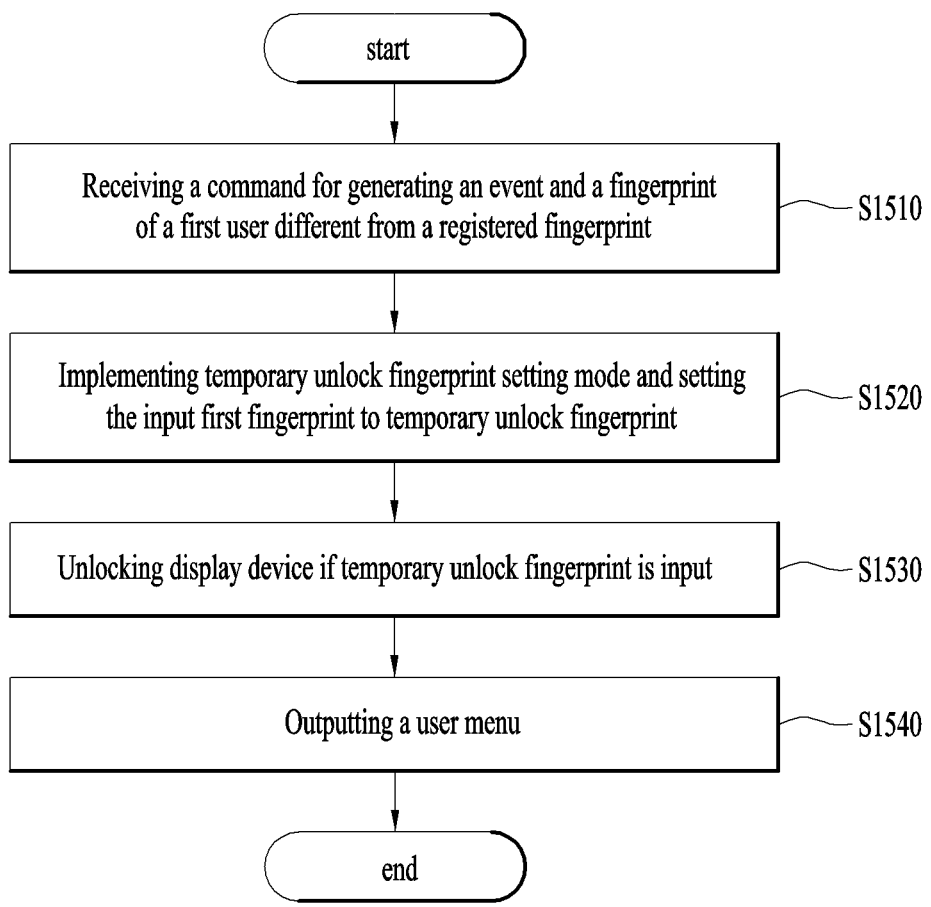

DISPLAY DEVICE AND METHOD FOR CONTROLLING THE SAME

This application claims the benefit of the Korean Patent Application No. 10-2014-0055613, filed on May 9, 2014, which is hereby incorporated by reference as if fully set forth herein.

BACKGROUND OF THE INVENTION

1. Field of the Invention

The present specification relates to a display device and a method for controlling the same.

2. Discussion of the Related Art

With the development of the electronic and communication technologies, various display devices have been developed. With miniaturization and popularization of the display devices, the display devices for personal use have been increased. Also, with the development of a display device having high options, the display device could perform various functions such as Internet access, photographing, watching of moving video, music play, navigation function, and storage of private personal information in addition to basic functions.

As the display device performs various functions and is used for personal use, users use the display device by setting a lock function to the display device. Examples of a method for setting a lock function include a password input, an unlock pattern input, and an unlock touch command input. Although the display device is used for personal use, it is likely to occur that a user of the display device is requested by the third party to use the display device. In this case, the user of the display device should lend the display device to the third party by unlocking the display device or inform the third party of a method how to unlock the display device. If the user lends the display device to the third party by unlocking the display device, the display device may be locked again in accordance with an operation such as screen-off of the display device.

In this case, since the third party may again request the user to unlock the display device, the user may feel inconvenience. Also, if the user informs the third party of the method how to unlock the display device, the user should change a lock mode to maintain security of the display device, whereby inconvenience may be caused.

In order to solve such problems, a guest unlock mode has been developed. However, the guest unlock mode permits some function only of functions of the display device. Accordingly, if the third party intends to use a function which is not permitted in the guest unlock mode, the user should again set a permission function, whereby inconvenience may be caused. Accordingly, the need of a method for conveniently setting a temporary unlock mode exists.

SUMMARY OF THE INVENTION

Accordingly, the present specification is directed to a display device and a method for controlling the same, which substantially obviate one or more problems due to limitations and disadvantages of the related art.

An object of the present specification is to provide a display device and a method for controlling the same, in which a temporary unlock mode may be set and released using a fingerprint.

Additional advantages, objects, and features of the specification will be set forth in part in the description which follows and in part will become apparent to those having ordinary skill in the art upon examination of the following or may be learned from practice of the specification. The objectives and other advantages of the specification may be realized and attained by the structure particularly pointed out in the written description and claims hereof as well as the appended drawings.

To achieve these objects and other advantages and in accordance with the purpose of the specification, as embodied and broadly described herein, a display device according to one embodiment an input unit configured to receive a command for generating an event and to receive a fingerprint; a control unit configured to generate the event in accordance with the command and process the generated event; and a display unit configured to display a user menu, wherein the input unit includes a touch recognition layer for recognizing a touch input and a fingerprint recognition layer for recognizing a fingerprint, the touch recognition layer and the fingerprint recognition layer being formed in a single body with the display unit and receiving a command for generating an event for a temporary unlock fingerprint setting mode and a first fingerprint different from a registered fingerprint, the control unit implements the temporary unlock fingerprint setting mode in accordance with the command for generating the input event, sets the input of the first fingerprint to a temporary unlock fingerprint, and unlocks the display device when the temporary unlock fingerprint is inputted, and the temporary unlock fingerprint is released in accordance with a predetermined condition.

The control unit may recognize the command for generating an event for a temporary unlock fingerprint setting mode when the registered fingerprint is inputted for a predetermined time or more.

Also, the input unit may receive the registered fingerprint when the display unit is turned off.

Also, the control unit may recognize the command for generating an event for a temporary unlock fingerprint setting mode when the registered fingerprint and the first fingerprint are inputted together.

Also, the display device may further comprise a storage unit configured to store a second fingerprint for generating an event for the temporary unlock fingerprint setting mode, the second fingerprint being different from a fingerprint for master unlock, wherein the control unit recognizes the command for generating an event for a temporary unlock fingerprint setting mode when the second fingerprint is inputted.

Also, the control unit may recognize the command for generating an event for a temporary unlock fingerprint setting mode when a predetermined area is touched for a predetermined time or more.

Also, the control unit may recognize the command for generating an event for a temporary unlock fingerprint setting mode when a predetermined screen is outputted to the display unit and a predetermined area of the output screen is touched.

And, the control unit may recognize the command for generating an event for a temporary unlock fingerprint setting mode when at least one of a predetermined first touch pattern and a first knock-on pattern is inputted.

Meanwhile, the display unit may be turned off.

And, the input unit includes a function key, and the control unit may recognize the command for generating an event for a temporary unlock fingerprint setting mode when the user command is inputted through the function key.

Also, the control unit may control the display unit to display a fingerprint input guide for inputting the first fingerprint when the temporary unlock fingerprint setting mode is implemented.

Meanwhile, the fingerprint input guide may include at least one of a fingerprint input window, a fingerprint input area display, and a fingerprint input position display.

The predetermined condition may be a condition for initially inputting the registered fingerprint after the temporary unlock fingerprint is set.

Also, the predetermined condition may be a condition for inputting at least one of a predetermined second touch pattern and a predetermined second knock-on pattern.

Also, the temporary unlock fingerprint may include valid time limit attributes, and the predetermined condition may be a condition for expiring a predetermined valid time.

The temporary unlock fingerprint may include limit attributes for a number of unlock times, and the predetermined condition may be a condition that the number of unlock times is a predetermined number of unlock times.

Meanwhile, the control unit may control the display unit to output a message asking whether the temporary unlock fingerprint is released, when there is no input of the temporary unlock fingerprint for a predetermined time.

The display unit may output a release alarm message of the temporary unlock fingerprint.

Meanwhile, the display device may further comprise a storage unit configured to store a third fingerprint different from a fingerprint for master unlock, wherein the control unit may again give an unlock power to a released temporary unlock fingerprint within a predetermined time when the third fingerprint is inputted.

In another aspect of the present specification, a method for controlling a display device comprises the steps of receiving a command for generating an event and receiving a fingerprint; generating the event in accordance with the command and processing the generated event; and outputting a user menu, wherein the receiving step includes receiving a command for generating an event for a temporary unlock fingerprint setting mode and a first fingerprint different from a registered fingerprint, the step of generating the event and processing the generated event includes implementing the temporary unlock fingerprint setting mode in accordance with the command for generating the input event, setting the input first fingerprint to a temporary unlock fingerprint, and unlocking the display device when the temporary unlock fingerprint is inputted, and the temporary unlock fingerprint is released in accordance with a predetermined condition.

According to the aforementioned various embodiments, the display device and the method for controlling the same may provide a function of conveniently setting or releasing a temporary unlock fingerprint.

Also, the display device and the method for controlling the same may set a temporary unlock fingerprint that includes various attributes.

Also, the display device and the method for controlling the same may output a message related to setting or release of a temporary unlock fingerprint to allow the user to recognize setting or release of the temporary unlock fingerprint.

Also, the display device and the method for controlling the same may give an unlock power to a temporary unlock fingerprint which is released.

It is to be understood that both the foregoing general description and the following detailed description of the present specification are exemplary and explanatory and are intended to provide further explanation of the specification as claimed.

BRIEF DESCRIPTION OF THE DRAWINGS

The accompanying drawings, which are included to provide a further understanding of the specification and are incorporated in and constitute a part of this application, illustrate embodiment(s) of the specification and together with the description serve to explain the principle of the specification. In the drawings:

FIG. 15 is a flow chart illustrating a method for controlling a display device according to one embodiment.

DETAILED DESCRIPTION OF THE INVENTION

Figure 1:
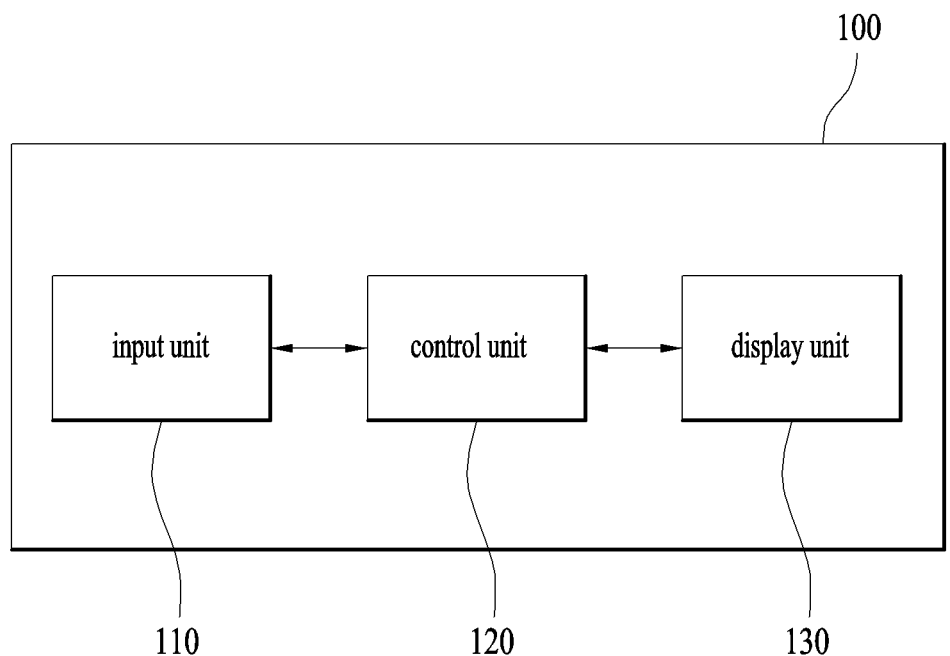
FIG. 1 is a block diagram illustrating a display device according to one embodiment.

Reference will now be made in detail to the preferred embodiments of the present specification, examples of which are illustrated in the accompanying drawings. Wherever possible, the same reference numbers will be used throughout the drawings to refer to the same or like parts. At this time, configurations and operations of the present specification illustrated in the drawings and described by the drawings are described as at least one embodiment, and technical spirits and subject matters of the present specification are not limited by such embodiment.

Although the terms used in the present specification are selected from generally known and used terms considering their functions in the present specification, the terms can be modified depending on intention of a person skilled in the art, practices, or the advent of new technology. Also, in special case, the terms mentioned in the description of the present specification may be selected by the applicant at his or her discretion, the detailed meanings of which are described in relevant parts of the description herein. Accordingly, the terms used herein should be understood not simply by the actual terms used but by the meaning lying within and the description disclosed herein.

FIG. 1 is a block diagram illustrating a display device according to one embodiment.

Referring to FIG. 1, the display device 100 may include an input unit 110, a control unit 120, and a display unit 130.

The input unit 110 may receive a command for generating an event, and a fingerprint. For example, the input unit 110 may be provided in various manners such as a touch screen, a touch pad, a keyboard, a function key. In one embodiment, the input unit 110 may include a touch recognition layer for recognizing a touch input, and a fingerprint recognition layer for recognizing a fingerprint. The touch recognition layer and the fingerprint recognition layer may be formed in a single body with the display unit 130. In this case, if a touch input is received on the display unit 130, the display device 100 may recognize the input touch gesture through the touch recognition layer and perform a corresponding operation. Also, if a fingerprint input is received on the display unit 130, the display device 100 may recognize the input fingerprint through the fingerprint recognition layer and perform a corresponding operation. If the input unit 110 is provided as a touch pad, the touch pad may receive the input touch gesture or fingerprint.

The input unit 110 may receive a command for generating an event of a temporary unlock fingerprint setting mode. The display device 100 may register a master fingerprint and store the registered master fingerprint therein. The master fingerprint means a manager fingerprint registered by an owner for security of the display device 100. The temporary unlock fingerprint setting mode means a mode for registering a fingerprint other than the mater fingerprint as a temporary unlock fingerprint.

For example, the command for generating an event of a temporary unlock fingerprint setting mode may be a condition for inputting the registered fingerprint for a predetermined time or more. In this case, the registered fingerprint may be the master fingerprint, or may be a fingerprint separately registered to generate the event of the temporary unlock fingerprint setting mode.

Otherwise, the command for generating an event of a temporary unlock fingerprint setting mode may be a condition for inputting both the registered fingerprint and a random fingerprint which is not registered. Otherwise, the command for generating an event of a temporary unlock fingerprint setting mode may be a condition for touching a predetermined area for a predetermined time or more, or a condition for outputting a predetermined screen and touching a predetermined area of the output screen. Otherwise, the command for generating an event of a temporary unlock fingerprint setting mode may be a condition for inputting a predetermined touch pattern or knock-on pattern, or a condition for inputting a command of a user through a function key. Hereinafter, the command for generating an event of a temporary unlock fingerprint setting mode will be described in more detail.

The input unit 110 may receive a fingerprint together with the command for generating an event of a temporary unlock fingerprint setting mode. The fingerprint may be input to the input unit 110 simultaneously with the command for generating an event of a temporary unlock fingerprint setting mode or sequentially. The input fingerprint is the fingerprint for setting the temporary unlock fingerprint. Accordingly, the input fingerprint may be a separate fingerprint different from the fingerprint (for example, master fingerprint) registered in the display device 100. Also, the input fingerprint may be set to temporary unlock fingerprint to unlock the display device 100 for a time period when an unlock power is valid. The time period when the unlock power is valid means that the registered unlock fingerprint is temporarily used.

The control unit 120 may generate an event in accordance with a command for generating the event and process the generated event. If the aforementioned predetermined condition is input, the control unit 120 may recognize the predetermined condition as the command for generating an event of a temporary unlock fingerprint setting mode. The control unit 120 may implement the temporary unlock fingerprint setting mode in accordance with the command for generating the event of the temporary unlock fingerprint setting mode. The control unit 120 may set the fingerprint input at the state of the temporary unlock fingerprint setting mode to the temporary unlock fingerprint. If the set temporary unlock fingerprint is input, the control unit 120 may unlock the display device 100.

The temporary unlock fingerprint may be released in accordance with a predetermined condition. As described above, the temporary unlock fingerprint may unlock the display device 100 for a necessary time period. Accordingly, the temporary unlock fingerprint may be released by a predetermined reference or selection of a master user. For example, a condition for releasing the temporary unlock fingerprint may be a condition for initially inputting a fingerprint registered after the temporary unlock fingerprint is set. Alternatively, the condition for releasing the temporary unlock fingerprint may be a condition for inputting a predetermined touch pattern for release or a predetermined knock-on pattern. As the case may be, the temporary unlock fingerprint may include limit attributes, and may automatically be released if a condition of limit attributes is satisfied.

If there is no input of the temporary unlock fingerprint for a predetermined time, the control unit 120 may control the display unit 130 to output a message asking whether to release the temporary unlock fingerprint.

The display unit 130 may output a user menu. The display device 100 may release lock and perform its function if the temporary unlock fingerprint is input. For example, the display unit 130 may be provided as a touch display that includes a fingerprint recognition layer, a touch recognition layer and a display panel.

The display unit 130 may output a release alarm message of the temporary unlock fingerprint. The message related to release of the temporary unlock fingerprint may be a message such as a release confirm message or a release alarm message. The release confirm message may be a message asking whether to release the temporary unlock fingerprint again so as not to allow the user to release the temporary unlock pattern in error. The release alarm message may be a confirm message indicating that the temporary unlock fingerprint has been released.

The block diagram of the display device 100 has been described as above. Hereinafter, various embodiments for setting the temporary unlock fingerprint will be described.

Figure 2:
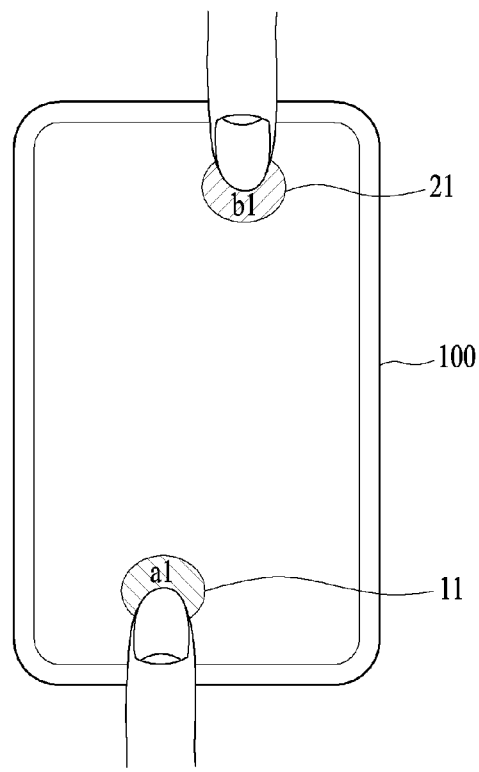
FIG. 2 is a diagram illustrating a method for setting a temporary unlock fingerprint according to the first embodiment.

FIG. 2 is a diagram illustrating a method for setting a temporary unlock fingerprint according to the first embodiment.

Referring to FIG. 2, a main user and a first user together touch a display screen of the display device 100. The display device 100 may receive a fingerprint 21 of the first user together with a registered fingerprint 11 of the main user. The fingerprint 21 of the first user may be a fingerprint intended to be set as a temporary unlock fingerprint which is not registered in the display device 100.

If the registered fingerprint 11 and the fingerprint 21 of the first user are together input to the display device 100, the display device 100 may recognize the fingerprints as a command for generating an event of a temporary unlock fingerprint setting mode. Accordingly, the display device 100 may perform the temporary unlock fingerprint setting mode and set the fingerprint 21 of the first user to the temporary unlock fingerprint.

The registered fingerprint 11 and the fingerprint 21 of the first user may be input to the display device 100 at the same time. Alternatively, the registered fingerprint 11 and the fingerprint 21 of the first user may be input to the display device 100 sequentially.

As the case may be, the display device 100 may implement the temporary unlock fingerprint setting mode before the fingerprint 21 of the first user is input thereto. For example, if the registered fingerprint 11 is input to the display device 100 for a predetermined time or more, the display device 100 may recognize the registered fingerprint 11 as the command for generating an event of a temporary unlock fingerprint setting mode. Accordingly, the display device 100 may set the fingerprint 21 of the first user to the temporary unlock fingerprint after the temporary unlock fingerprint setting mode state. The predetermined time may be set to 1 second, 2 seconds, etc., for example.

If the registered fingerprint 11 is input to the display device 100 or if the fingerprint 21 of the first user is input to the display device 100 together with the registered fingerprint 11, the display unit may be turned off (turned-off state). In other words, even at the turned-off state, if the registered fingerprint 11 is input to the display device 100 for a predetermined time or more, or if the fingerprint 21 of the first user is input to the display device 100 together with the registered fingerprint 11, the display device 100 may implement the temporary unlock fingerprint setting mode while maintaining the turned-off state.

Figure 3:
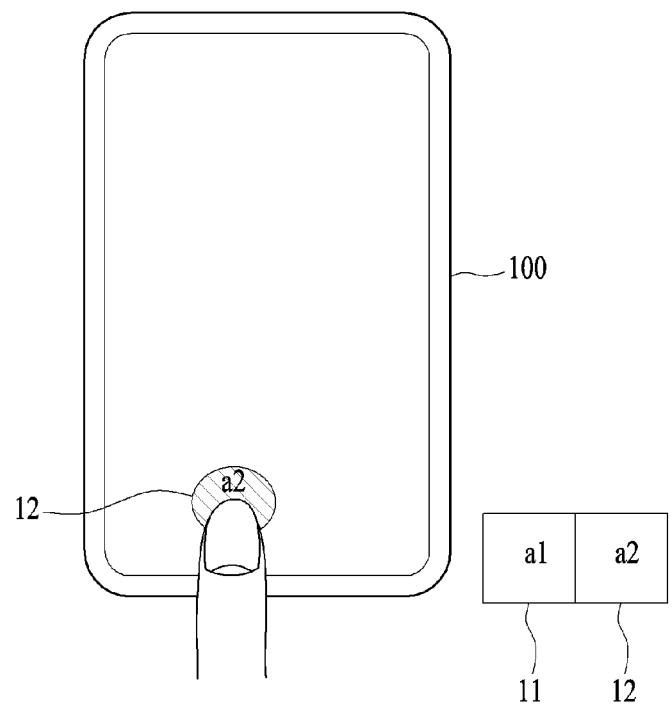
FIG. 3 is a diagram illustrating a method for setting a temporary unlock fingerprint according to the second embodiment.

FIG. 3 is a diagram illustrating a method for setting a temporary unlock fingerprint according to the second embodiment.

Referring to FIG. 3, a main fingerprint 11 for master unlock and a fingerprint 12 for generating an event of a temporary unlock fingerprint setting mode may exist separately from each other. The display device 100 may further include a storage unit (not shown) for storing the main fingerprint 11 and the fingerprint 12 for generating an event. Alternatively, the storage unit may store feature information only of the main fingerprint 11 and the fingerprint 12 for generating an event. The display device 100 may be unlocked if the main fingerprint 11 is input thereto. If the fingerprint 12 for generating an event of a temporary unlock fingerprint setting mode is input to the display device 100, the display device 100 may recognize the fingerprint 12 as a command for generating an event of a temporary unlock fingerprint setting mode. Accordingly, the display device 100 may set a random fingerprint, which is input, to the temporary unlock fingerprint by performing the temporary unlock fingerprint setting mode.

Figure 4:
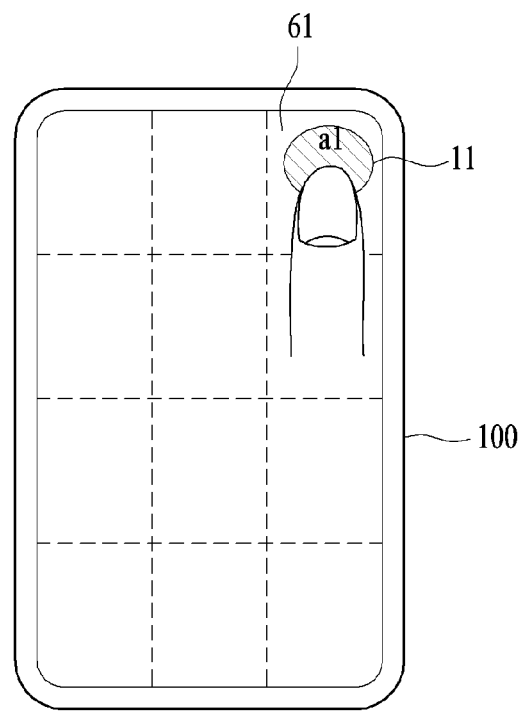
FIG. 4 is a diagram illustrating a method for setting a temporary unlock fingerprint according to the third embodiment.

FIG. 4 is a diagram illustrating a method for setting a temporary unlock fingerprint according to the third embodiment.

Referring to FIG. 4, a display screen of the display device 100 is divided into a plurality of areas. A line dividing the plurality of areas may not be displayed. The plurality of areas may be divided in various manners. For example, the plurality of areas may be divided into horizontal and vertical areas, or may be divided into horizontal or vertical areas only.

The display device 100 may display the divided areas when an area for generating an event of a temporary unlock fingerprint setting mode is set. The display device 100 may display the divided areas at an area setup menu and receive a command for selecting any one area from the user. If a touch gesture for the selected area 61 is input to the display device 100, the display device 100 may recognize the touch gesture as the command for generating an event of a temporary unlock fingerprint setting mode.

At this time, the display device 100 may consider the registered fingerprint 11 and the touch gesture input for the selected area together. In other words, if the registered fingerprint 11 in the selected area 61 is input to the display device 100, the display device 100 may recognize the registered fingerprint 11 as the command for generating an event of a temporary unlock fingerprint setting mode. Otherwise, if the selected area 61 is touched for a predetermined time or more, the display device 100 may recognize the touch of the selected area as the command for generating an event of a temporary unlock fingerprint setting mode. Otherwise, the display device 100 may consider all of the registered fingerprint 11, the predetermined time, and the selected area 61. In other words, if the registered fingerprint 11 is input from the selected area 61 for the predetermined time or more, the display device 100 may recognize the registered fingerprint 11 as the command for generating an event of a temporary unlock fingerprint setting mode. For example, the predetermined time may be set to 1 second, 2 seconds, etc., for example.

Figure 5:
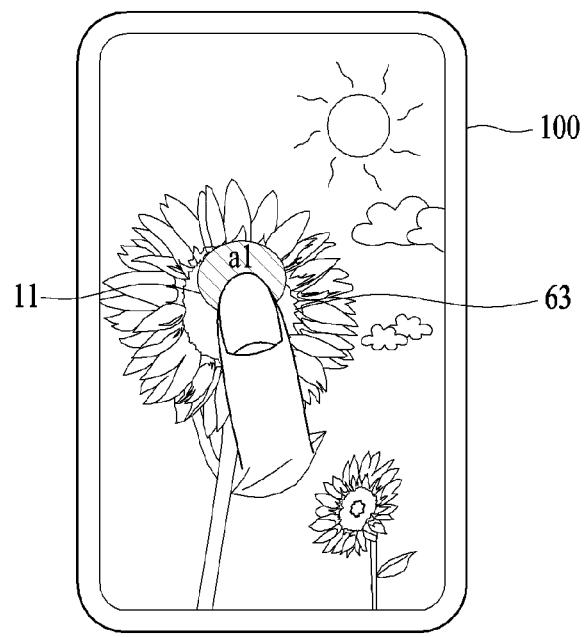
FIG. 5 is a diagram illustrating a method for setting a temporary unlock fingerprint according to the fourth embodiment.

FIG. 5 is a diagram illustrating a method for setting a temporary unlock fingerprint according to the fourth embodiment.

Referring to FIG. 5, the display device 100 outputs a predetermined screen. If a predetermined area of the predetermined screen is touched, the display device 100 may recognize the touched area as a command for generating an event of a temporary unlock fingerprint setting mode.

The display device 100 may set a specific area of a specific screen to a touch area for generating an event of a temporary unlock fingerprint setting mode in accordance with selection of the user. The specific screen may be various images stored in the display device 100. For example, the various images may include flower, tree, person, building, etc. The display device 100 may divide the selected image into a plurality of areas and receive a selection command of a touch area for generating an event of a temporary unlock fingerprint setting mode. For example, the plurality of areas may be the areas divided at a constant size as described with reference to FIG. 4, or may be the areas divided on the basis of a contour line of the selected image. As the case may be, the display device 100 may set the touch area as coordinate information for input of a touch gesture regardless of the selected image.

The display device may output the selected image in accordance with selection of the user after setting a condition for generating an event of a temporary unlock fingerprint setting mode. If a predetermined selection area 63 is touched on the selected image, the display device 100 may recognize the touched selection area 63 as the command for generating an event of a temporary unlock fingerprint setting mode. As the case may be, the display device 100 may consider the registered fingerprint 11 together with the selected area. In other words, if the selected screen is output to the display unit and the registered fingerprint 11 in the predetermined selection area 63 of the output screen is input, the display device 100 may recognize the registered fingerprint 11 as the command for generating an event of a temporary unlock fingerprint setting mode.

Figure 6:
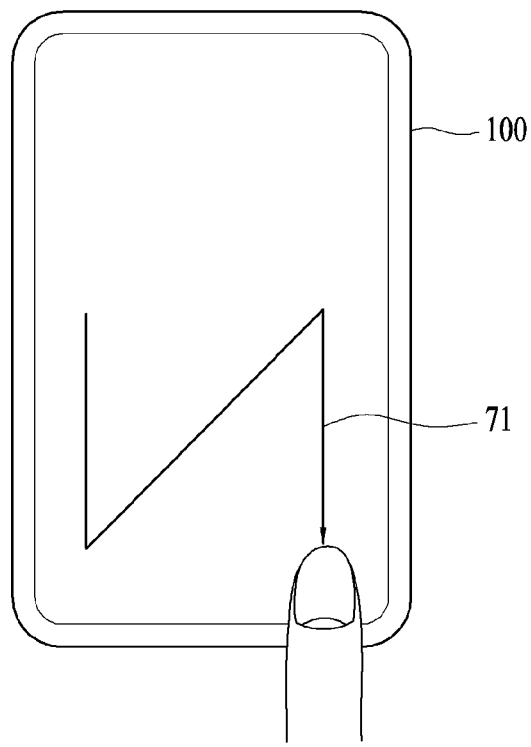
FIG. 6 is a diagram illustrating a method for setting a temporary unlock fingerprint according to the fifth embodiment.

FIG. 6 is a diagram illustrating a method for setting a temporary unlock fingerprint according to the fifth embodiment.

A touch pattern or knock-on pattern for generating an event of a temporary unlock fingerprint setting mode may be set. The touch pattern means a pattern continuous on a touch display, and the knock-on pattern means a pattern for knocking at least one area of the touch display.

The touch pattern or knock-on pattern for generating an event of a temporary unlock fingerprint setting mode may be set in advance. Afterwards, if the set touch pattern or knock-on pattern is input to the display device 100, the display device 100 may recognize the input pattern as a command for generating an event of a temporary unlock fingerprint setting mode. Both the touch pattern and knock-on pattern for generating an event of a temporary unlock fingerprint setting mode may be set. If one of the set touch pattern and knock-on pattern is input to the display device 100, the display device 100 may recognize the input pattern as the command for generating an event of a temporary unlock fingerprint setting mode.

The display device 100 may implement the temporary unlock fingerprint setting mode by receiving the set touch pattern or knock-on pattern even at the turned-off state.

Figure 7:
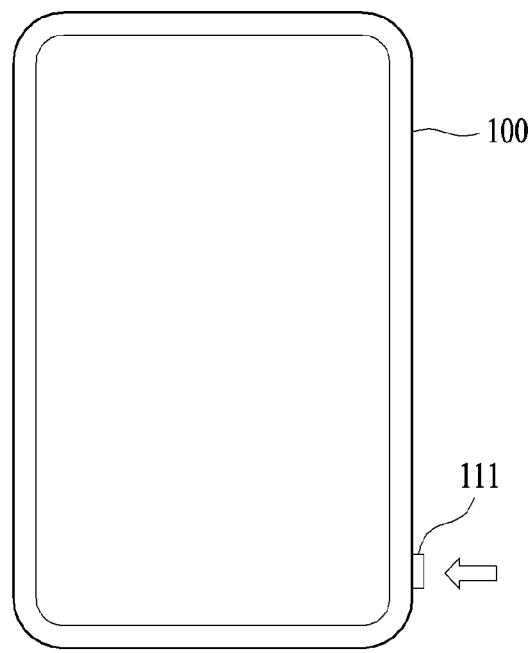
FIG. 7 is a diagram illustrating a method for setting a temporary unlock fingerprint according to the sixth embodiment.

FIG. 7 is a diagram illustrating a method for setting a temporary unlock fingerprint according to the sixth embodiment.

Referring to FIG. 7, the display device 100 may include a function key 111. If the function key 111 is pushed, the display device 100 may recognize the function key 111 as a command for generating an event of a temporary unlock fingerprint setting mode. Although FIG. 7 illustrates that the function key 111 is extended from a side of the display device 100, the function key 111 may be arranged at a front side, a rear side, an upper side or a lower side of the display device 100. Also, the function key 111 may be provided as a touch pad type not the extended type.

Also, although FIG. 7 illustrates the function key 111 implemented in hardware, the function key 111 may be provided in a touch display unit in the form of a soft key.

When the command for generating an event of a temporary unlock fingerprint setting mode is input to the display device 100, the display device 100 may be turned off. However, the display device 100 may display a fingerprint input guide while being turned on as the case may be.

Figure 8:
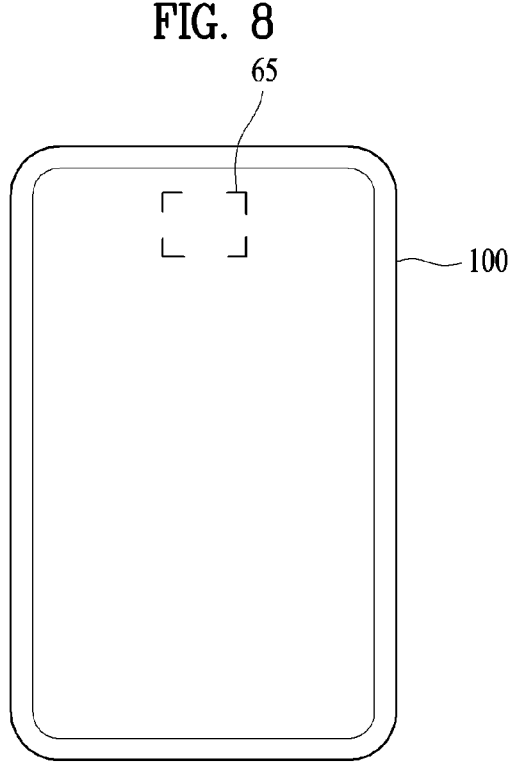
FIG. 8 is a diagram illustrating a fingerprint input guide according to one embodiment.

FIG. 8 is a diagram illustrating a fingerprint input guide according to one embodiment.

Referring to FIG. 8, the display device 100 on which a fingerprint input guide 65 is displayed is shown. If a temporary unlock fingerprint setting mode is implemented, the display device 100 may display the fingerprint input guide 65 to receive a fingerprint for setting a temporary unlock fingerprint. The fingerprint input guide 65 means display of an area where a fingerprint for setting will be input. In this case, the display device 100 may recognize the fingerprint by scanning only the area for the fingerprint input guide 65, whereby power consumption may be reduced and the fingerprint may be recognized quickly.

For example, the fingerprint input guide 65 may be a fingerprint input window of various types such as a quadrangle or a circle, or a fingerprint input area display type. The fingerprint input window means a fingerprint input area of a complete figure type, and the fingerprint input area display means that a partial area edge is only displayed as shown in FIG. 8.

Figure 9:
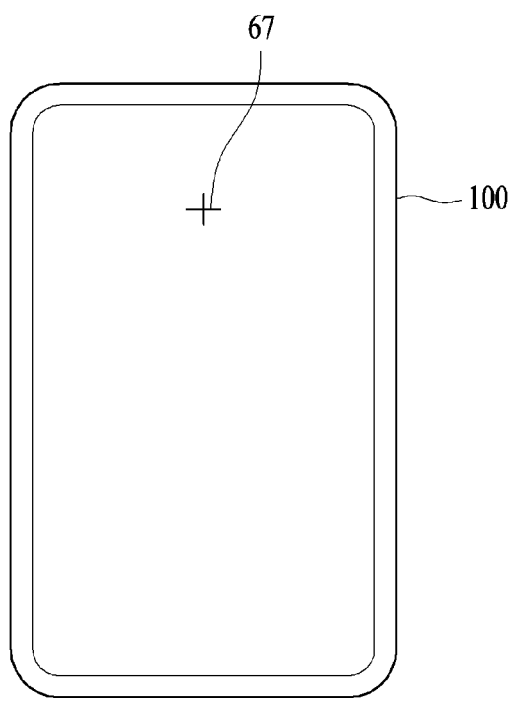
FIG. 9 is a diagram illustrating a fingerprint input guide according to another embodiment.

FIG. 9 is a diagram illustrating a fingerprint input guide according to another embodiment.

Referring to FIG. 9, the display device 100 on which another type fingerprint input guide 67 is displayed is shown. The fingerprint input guide 67 may be a type of a fingerprint input position display as shown in FIG. 9. The fingerprint input position display means that a center position for inputting a fingerprint, such as a cross mark, is only displayed.

As described above, if a temporary unlock fingerprint setting mode is implemented, the display device 100 may display the fingerprint input guide of various types.

Figure 10:
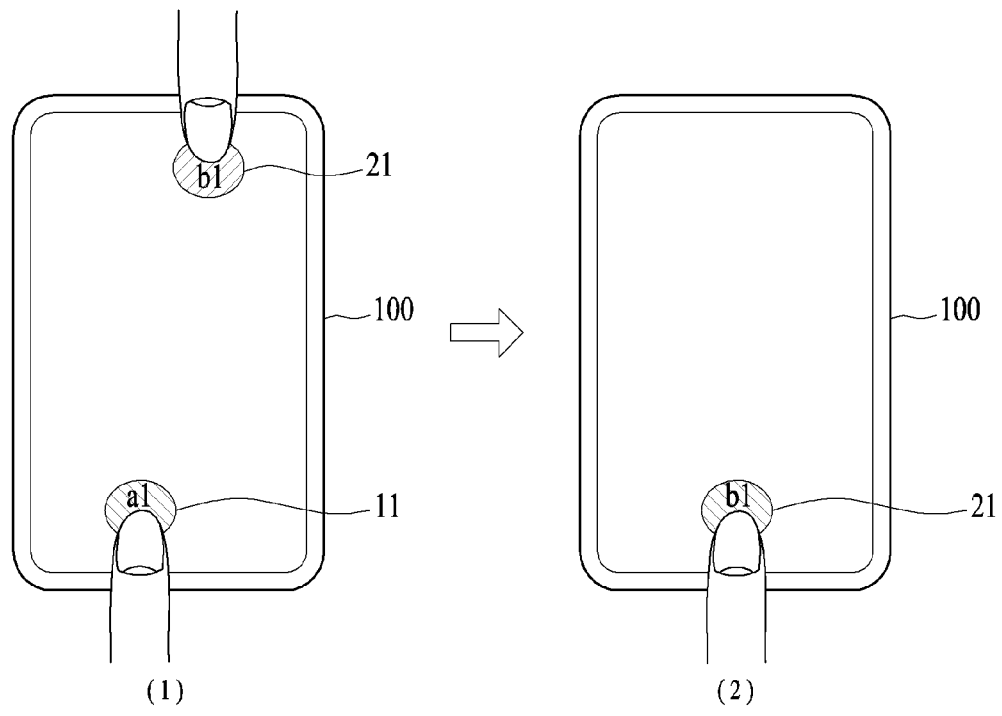
FIG. 10 is a diagram illustrating a method for releasing a temporary unlock fingerprint according to the first embodiment.
Figure 10:
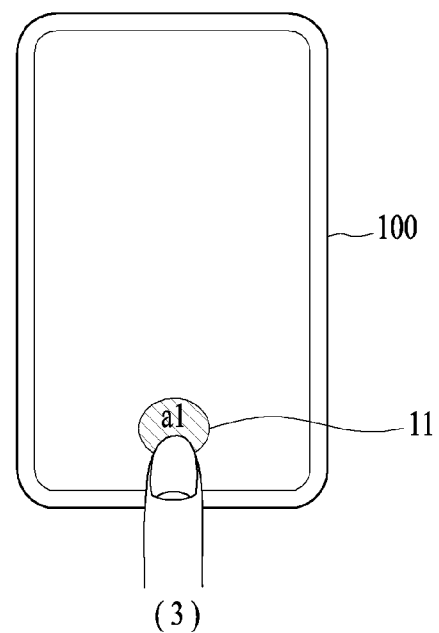

FIG. 10 is a diagram illustrating a method for releasing a temporary unlock fingerprint according to the first embodiment.

Referring to FIG. 10(1), the display device 100 may implement a temporary unlock fingerprint setting mode by receiving a registered fingerprint 11 and a fingerprint 21 of a first user, and may set the fingerprint 21 of the first user to a temporary unlock fingerprint. Although FIG. 10(1) illustrates that the temporary unlock fingerprint setting mode is implemented by receiving the registered fingerprint 11 and the fingerprint 21 of the first user together, the temporary unlock fingerprint setting mode may be implemented in various manners. For example, the display device 100 may implement the temporary unlock fingerprint setting mode if the registered fingerprint 11 is input for a predetermined time or more, or may implement the temporary unlock fingerprint setting mode if a predetermined area of a display unit is touched for a predetermined time or more. In addition, the display device 100 may implement the temporary unlock fingerprint setting mode in the aforementioned various manners.

Referring to FIG. 10(2), the display device 100 may set the fingerprint 21 of the first user to the temporary unlock fingerprint, and may be unlocked if the fingerprint 21 of the first user is input thereto. In other words, the first user may freely use the display device 100. The first user may return the display device 100 to an owner of the display device 100 after using the display device 100. The registered fingerprint 11 is a fingerprint of the owner. The display device 100 may release the fingerprint of the first user, which is set to the temporary unlock fingerprint.

Referring to FIG. 10(3), the display device 100 receives the registered fingerprint 11. In other words, the display device 100 may initially receive the registered fingerprint 11 after setting the fingerprint 21 of the first user to the temporary unlock fingerprint. At this time, the display device 100 may release the temporary unlock fingerprint.

For example, if the owner of the display device 100 lends the display device 100 to the first user, the first user may freely use the display device 100. Generally, the owner does not touch the display device 100 for the time when the first user uses the display device 100. If the first user returns the display device 100 to the owner after using the display device 100, the owner may touch the display device 100.

As described above, if the registered fingerprint 11 is initially input after the temporary unlock fingerprint is set, the display device 100 may release the set temporary unlock fingerprint. At this time, the display device 100 may be turned off.

Figure 11:
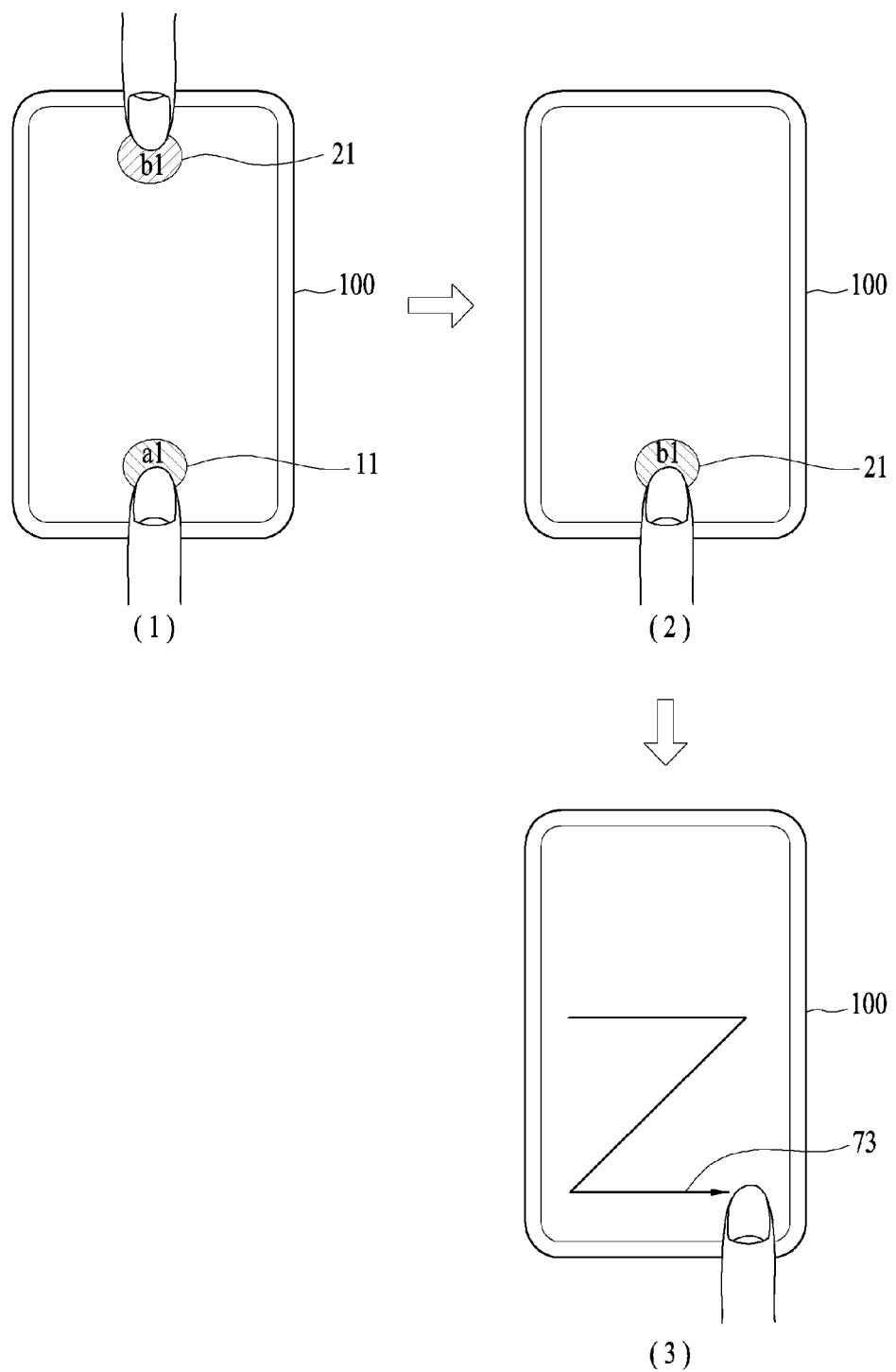
FIG. 11 is a diagram illustrating a method for releasing a temporary unlock fingerprint according to the second embodiment.

FIG. 11 is a diagram illustrating a method for releasing a temporary unlock fingerprint according to the second embodiment.

Referring to FIG. 11(1), the display device 100 may implement a temporary unlock fingerprint setting mode by receiving a registered fingerprint 11 and a fingerprint 21 of a first user, and may set the fingerprint 21 of the first user to a temporary unlock fingerprint. As shown in FIG. 10, the display device 100 may implement the temporary unlock fingerprint setting mode in the aforementioned various manners.

Referring to FIG. 11(2), the display device 100 may set the fingerprint 21 of the first user to the temporary unlock fingerprint, and may be unlocked if the fingerprint 21 of the first user is input thereto. In other words, the first user may freely use the display device 100. The display device 100 may release the fingerprint of the first user, which is set to the temporary unlock fingerprint.

Referring to FIG. 11(3), the display device 100 receives a predetermined touch pattern 73. At this time, the display device 100 may release the temporary unlock fingerprint. The touch pattern 73 for release may be set in advance. Also, if a knock-on pattern for release is set in advance and the display device 100 receives the knock-on pattern, the set temporary unlock fingerprint may be released.

Figure 12:
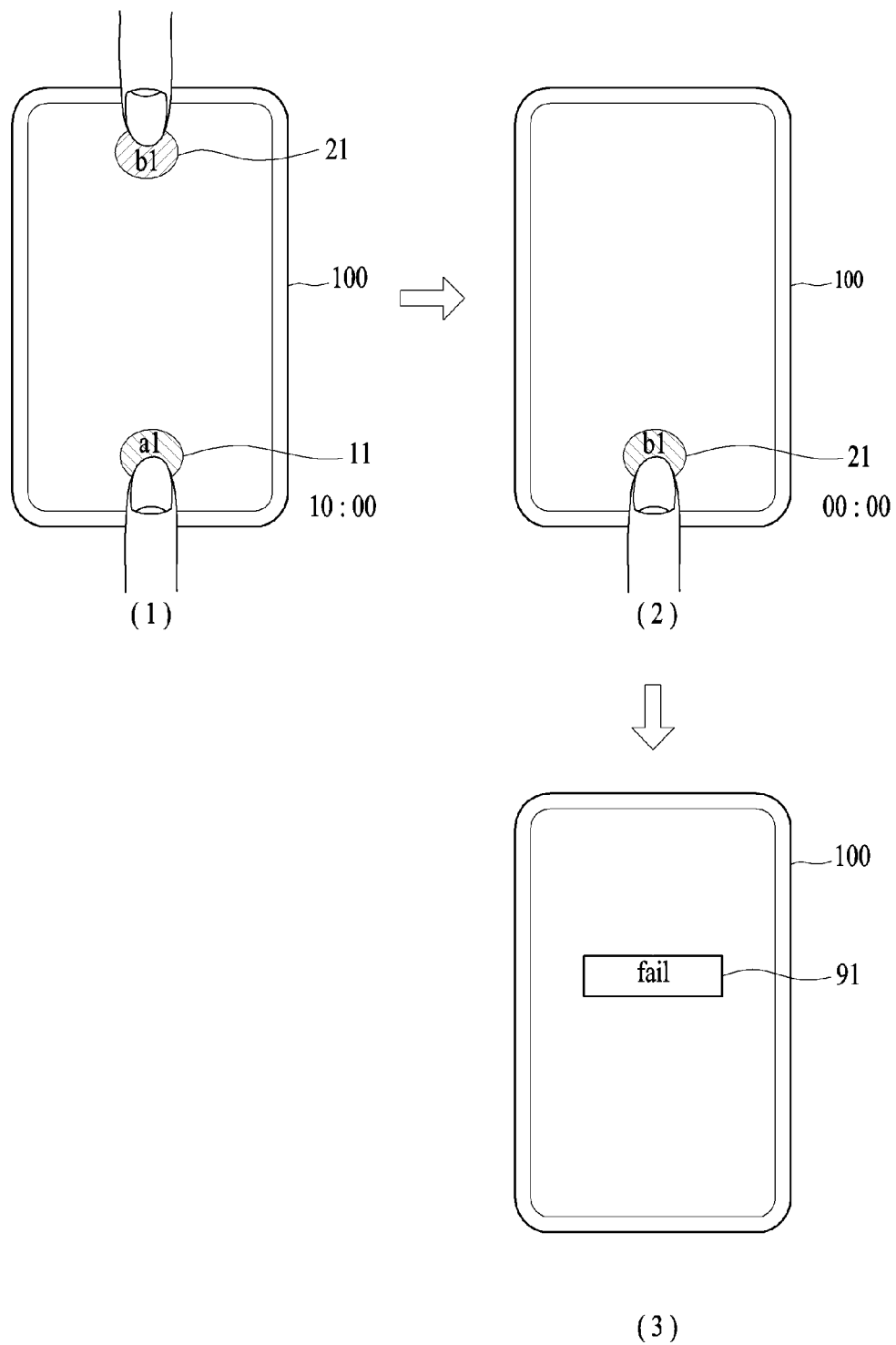
FIG. 12 is a diagram illustrating a method for releasing a temporary unlock fingerprint according to the third embodiment.

FIG. 12 is a diagram illustrating a method for releasing a temporary unlock fingerprint according to the third embodiment.

Referring to FIG. 12(1), the display device 100 may implement a temporary unlock fingerprint setting mode by receiving a registered fingerprint 11 and a fingerprint 21 of a first user, and may set the fingerprint 21 of the first user to a temporary unlock fingerprint. As described above, the display device 100 may implement the temporary unlock fingerprint setting mode in the aforementioned various manners.

The temporary unlock fingerprint may include limit attributes. For example, the limit attributes may be valid time limit attributes or limit attributes for the number of unlock times. If the temporary unlock fingerprint includes valid time limit attributes, an unlock power may be given to the temporary unlock fingerprint for a predetermined time. In other words, if the valid time passes, the unlock power of the temporary unlock fingerprint expires. Namely, the temporary unlock fingerprint may be released if the valid time expires.

If the temporary unlock fingerprint includes limit attributes for the number of unlock times, an unlock power may be given to the temporary unlock fingerprint for a predetermined number of times. In other words, if the number of unlock times reaches a predetermined number of times, the unlock power of the temporary unlock fingerprint expires.

For example, the finger print 21 of the first user may be set to the temporary unlock fingerprint that includes valid time limit attributes of ten minutes.

Referring to FIG. 12(2), the display device 100 may set the fingerprint 21 of the first user to the temporary unlock fingerprint, and may be unlocked if the fingerprint 21 of the first user is input thereto. In other words, the first user may freely use the display device 100 for ten minutes. The display device 100 may receive the fingerprint 21 of the first user after the valid time of ten minutes passes.

Referring to FIG. 12(3), a display screen of the display device 100 is shown in case that the fingerprint 21 of the first user is input after the valid time of ten minutes passes. Since the valid time has passed, the unlock power of the fingerprint 21 of the first user set to the temporary unlock fingerprint has expired. Accordingly, the display device 100 may display a message indicating fail.

The embodiment related to the temporary unlock fingerprint that includes valid time limit attributes has been described in FIG. 12. The temporary unlock fingerprint that includes limit attributes for the number of unlock times is similar to the example of the valid time limit attributes. For example, the fingerprint 21 of the first user may be set to the temporary unlock fingerprint that includes limit attributes of the number of unlock times corresponding to 10 times. The display device 100 may be unlocked until the fingerprint 21 of the first user is input 10 times. If the fingerprint 21 of the first user is input 11 times, the display device 100 may display a message indicating fail because the unlock power of the fingerprint 21 of the first user has expired.

A predetermined time condition may be considered in conjunction with unlock fingerprint setup and release. The display device may conveniently set or release the temporary unlock fingerprint in accordance with the aforementioned embodiments. The display device may set the temporary unlock fingerprint that includes various attributes.

Figure 13:
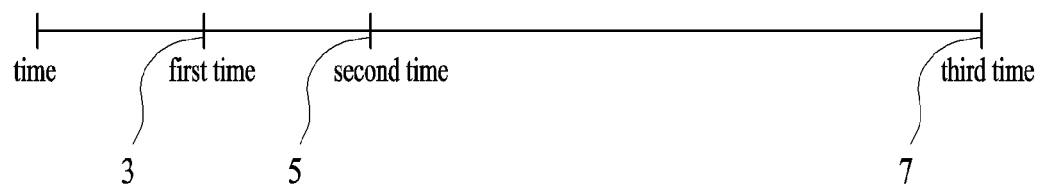
FIG. 13 is a diagram illustrating different functions performed in accordance with a predetermined time according to one embodiment.

FIG. 13 is a diagram illustrating different functions performed in accordance with a predetermined time according to one embodiment.

Referring to FIG. 13, a first time 3, a second time 5 and a third time 7 are shown.

For example, if a registered fingerprint is input for a first time 3 or more, the display device may recognize the registered fingerprint as a command for generating an event of a temporary unlock fingerprint setting mode. Alternatively, if a predetermined area of a display unit is touched for the first time 3 or more, the display device may recognize the touch as the command for generating an event of a temporary unlock fingerprint setting mode. The first time 3 may be calculated from the time when the fingerprint is input or the time when the fingerprint is touched on the display unit, and may be set to 3 seconds, 5 seconds, or the like.

Since the temporary unlock fingerprint includes valid time limit attributes set to a second time 5, the temporary unlock fingerprint may be released if the second time 5 passes. The second time 5 may be calculated from the time when the temporary unlock fingerprint is set, and may be set to 10 minutes, 30 minutes, or the like.

Also, if there is no input of a valid temporary unlock fingerprint for a third time 7, the display device may output a message asking whether the temporary unlock fingerprint is released. The third time 7 may be calculated from the time when the temporary unlock fingerprint is input finally, and may be set to 1 day, 7 days, or the like. If the temporary unlock fingerprint is released, the display device may output a release alarm message of the temporary unlock fingerprint. The release alarm message may mean a confirm message indicating that the temporary unlock fingerprint has been released. In this way, the display device may output a message related to setup and release of the temporary unlock fingerprint to allow the user to recognize the message.

Meanwhile, the display device may again give an unlock power to the released temporary unlock fingerprint.

Figure 14:
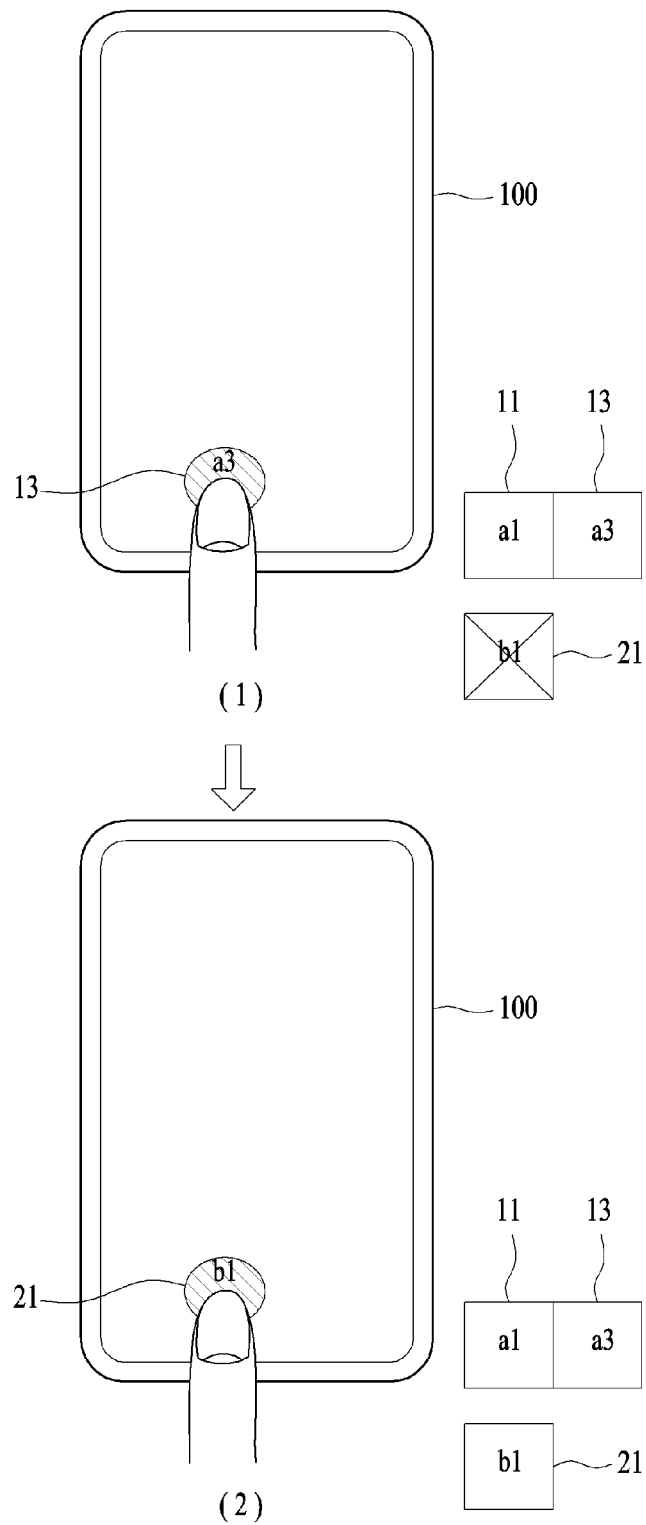
FIG. 14 is a diagram illustrating a method for giving an unlock power to a temporary unlock fingerprint, which is released, according to one embodiment.

FIG. 14 is a diagram illustrating a method for giving an unlock power to a temporary unlock fingerprint, which is released, according to one embodiment.

Referring to FIG. 14(1), the display device 100 may include a main fingerprint 11 for master unlock and a separate fingerprint 13 for recovering a temporary unlock fingerprint, which is released. The display device 100 may further include a storage unit (not shown) for storing the finger 13 for recovering the released temporary unlock fingerprint. A fingerprint 21 of a first user, which is set to the temporary unlock fingerprint, has been released.

However, the display device may store fingerprint information of the first user, which is released, for a predetermined time. For example, the predetermined time may be set to one week. The predetermined time may be set by the user. Alternatively, the display device may store temporary unlock fingerprint information which is finally set.

Even though the fingerprint 21 of the first user is input at the current state, the display device 100 is not unlocked. The display device 100 may receive the fingerprint 13 for recovering the released temporary unlock fingerprint.

Referring to FIG. 14(2), the display device 100 may again give the unlock power to the fingerprint 21 of the first user if the fingerprint 13 for recovering the released temporary unlock fingerprint is input thereto. Accordingly, if the fingerprint 21 of the first user is input, the display device 100 may be unlocked. The recovered fingerprint 21 of the first user may be released again in the aforementioned manner. The display device may again give the unlock power to the released temporary unlock fingerprint.

FIG. 15 is a flow chart illustrating a method for controlling a display device according to one embodiment.

Referring to FIG. 15, the display device may receive a command for generating an event and a fingerprint of a first user, which is different from a registered fingerprint (S1510). The command for generating an event may mean that the registered fingerprint is input for a predetermined time or more. Otherwise, the command for generating an event may mean that the registered fingerprint and the fingerprint of the first user may be input together. Otherwise, the command for generating an event may mean that a separate fingerprint for generating an event of a temporary fingerprint setting mode is input. Otherwise, the command for generating an event may mean that a predetermined area of the display unit is touched for a predetermined time or more. Otherwise, the command for generating an event may mean that a predetermined portion is touched on a predetermined screen. Otherwise, the command for generating an event may mean that a touch pattern or knock-on pattern for implementing a temporary unlock fingerprint setting mode is input.

The display device may generate an event in accordance with the command and process the generated event. In other words, the display device may implement the temporary unlock fingerprint setting mode and set the fingerprint of the first user to the temporary unlock fingerprint (S1520). As the case may be, the temporary unlock fingerprint may include limit attributes. For example, the limit attributes may be valid time limit attributes or limit attributes for the number of unlock times.

If the temporary unlock fingerprint is input to the display device, the display device may be unlocked (S1530). The display device may output a user menu (S1540). The temporary unlock fingerprint may be released in accordance with a predetermined condition. For example, the predetermined condition may be a condition for inputting a fingerprint initially registered after the temporary unlock fingerprint is set, or a condition for inputting a touch pattern or knock-on pattern set for release.

The display device and the method for controlling the same according to the present specification are not limited to the aforementioned embodiments, and all or some of the aforementioned embodiments may selectively be configured in combination so that various modifications may be made in the aforementioned embodiments.

In the meantime, the method for controlling the display device of the present specification may be implemented in a recording medium, which can be read by a processor provided in the display device, as a code that can be read by the processor. The recording medium that can be read by the processor includes all kinds of recording media in which data that can be read by the processor are stored. Examples of the recording medium include a ROM, a RAM, a CD-ROM, a magnetic tape, a floppy disk, and an optical data memory. Also, another example of the recording medium may be implemented in a type of carrier wave such as transmission through Internet. Also, the recording medium that can be read by the processor may be distributed in a computer system connected thereto through a network, whereby codes that can be read by the processor may be stored and implemented in a distributive mode.

It will be apparent to those skilled in the art that the present specification can be embodied in other specific forms without departing from the spirit and essential characteristics of the specification. Thus, the above embodiments are to be considered in all respects as illustrative and not restrictive. The scope of the specification should be determined by reasonable interpretation of the appended claims and all change which comes within the equivalent scope of the specification are included in the scope of the specification.

What is claimed is:

1. A display device comprising:
    a storage unit;
    an input unit configured to receive a command for generating an event and to receive a fingerprint;
    a control unit configured to generate the event in accordance with the command and process the generated event; and
    a display unit configured to display a user menu,
    wherein the input unit includes a touch recognition layer for recognizing a touch input and a fingerprint recognition layer for recognizing a fingerprint, the touch recognition layer and the fingerprint recognition layer being formed in a single body with the display unit and receiving a command for generating an event for a temporary unlock fingerprint setting mode and a first fingerprint different from a registered fingerprint for master unlock,
    wherein the storage unit is configured to store a second fingerprint different from the registered fingerprint for master unlock,
    wherein the control unit is further configured to:
    implement the temporary unlock fingerprint setting mode in accordance with the command for generating the input event,
    set the input of the first fingerprint to a temporary unlock fingerprint,
    unlock the display device when the temporary unlock fingerprint is inputted,
    release the temporary unlock fingerprint in accordance with a predetermined condition, and
    give an unlock power to the released temporary unlock fingerprint within a predetermined time if the second fingerprint is inputted.

2. The display device according to claim 1, wherein the control unit recognizes the command for generating an event for a temporary unlock fingerprint setting mode when the registered fingerprint is inputted for a predetermined time or more.

3. The display device according to claim 2, wherein the input unit receives the registered fingerprint when the display unit is turned off.

4. The display device according to claim 1, wherein the control unit recognizes the command for generating an event for a temporary unlock fingerprint setting mode when the registered fingerprint and the first fingerprint are inputted together.

5. The display device according to claim 1, further comprising a storage unit configured to store a third fingerprint for generating an event for the temporary unlock fingerprint setting mode, the third fingerprint being different from a fingerprint for master unlock, wherein the control unit recognizes the command for generating an event for a temporary unlock fingerprint setting mode when the third fingerprint is inputted.

6. The display device according to claim 1, wherein the control unit recognizes the command for generating an event for a temporary unlock fingerprint setting mode when a predetermined area is touched for a predetermined time or more.

7. The display device according to claim 1, wherein the control unit recognizes the command for generating an event for a temporary unlock fingerprint setting mode when a predetermined screen is outputted to the display unit and a predetermined area of the output screen is touched.

8. The display device according to claim 1, wherein the control unit recognizes the command for generating an event for a temporary unlock fingerprint setting mode when at least one of a predetermined first touch pattern and a first knock-on pattern is inputted.

9. The display device according to claim 8, wherein the display unit is turned off.

10. The display device according to claim 1, wherein the input unit includes a function key, and the control unit recognizes the command for generating an event for a temporary unlock fingerprint setting mode when the user command is inputted through the function key.

11. The display device according to claim 1, wherein the control unit controls the display unit to display a fingerprint input guide for inputting the first fingerprint when the temporary unlock fingerprint setting mode is implemented.

12. The display device according to claim 11, wherein the fingerprint input guide includes at least one of a fingerprint input window, a fingerprint input area display, and a fingerprint input position display.

13. The display device according to claim 1, wherein the predetermined condition is a condition for initially inputting the registered fingerprint after the temporary unlock fingerprint is set.

14. The display device according to claim 1, wherein the predetermined condition is a condition for inputting at least one of a predetermined second touch pattern and a predetermined second knock-on pattern.

15. The display device according to claim 1, wherein the temporary unlock fingerprint includes valid time limit attributes, and the predetermined condition is a condition for expiring a predetermined valid time.

16. The display device according to claim 1, wherein the temporary unlock fingerprint includes limit attributes for a number of unlock times, and the predetermined condition is a condition that the number of unlock times is a predetermined number of unlock times.

17. The display device according to claim 1, wherein the control unit controls the display unit to output a message asking whether the temporary unlock fingerprint is released, when there is no input of the temporary unlock fingerprint for a predetermined time.

18. The display device according to claim 1, wherein the display unit outputs a release alarm message of the temporary unlock fingerprint.

19. A method for controlling a display device, the method comprising:
   receiving a command for generating an event for a temporary unlock fingerprint setting mode;
   implementing the temporary unlock fingerprint setting mode in accordance with the command for generating the event for the temporary unlock fingerprint setting mode;
   receiving a first fingerprint different from a registered fingerprint for master unlock;
   setting the first fingerprint to a temporary unlock fingerprint;
   unlocking the display device when the temporary unlock fingerprint is inputted;
   releasing the temporary unlock fingerprint in accordance with a predetermined condition; and
   giving an unlock power to the released temporary unlock fingerprint within a predetermined time if a second fingerprint is inputted,
   wherein the second fingerprint is stored at a storage unit and differs from the registered fingerprint for master unlock.

* * * * *